United States Patent
Iwasawa

(10) Patent No.: US 7,476,860 B2
(45) Date of Patent: Jan. 13, 2009

(54) OUTDOOR ACTIVE INFRARED DETECTION APPARATUS WITH ADJUSTABLE DRIVE FREQUENCY

(75) Inventor: Masashi Iwasawa, Otsu (JP)

(73) Assignee: OPTEX Co., Ltd., Shiga (JP)

( * ) Notice: Subject to any disclaimer, the term of this patent is extended or adjusted under 35 U.S.C. 154(b) by 0 days.

(21) Appl. No.: 11/274,111

(22) Filed: Nov. 16, 2005

(65) Prior Publication Data

US 2007/0001115 A1    Jan. 4, 2007

(30) Foreign Application Priority Data

Nov. 17, 2004    (JP) .............................. 2004-333226

(51) Int. Cl.
    *G01J 5/00*    (2006.01)
(52) U.S. Cl. .................. 250/338.1; 250/221; 340/565; 340/567
(58) Field of Classification Search ............. 250/338.1, 250/221; 340/565, 567
    See application file for complete search history.

(56) References Cited

U.S. PATENT DOCUMENTS

| | | | | |
|---|---|---|---|---|
| 4,736,097 A | * | 4/1988 | Philipp | 250/221 |
| RE33,668 E | * | 8/1991 | Gray | 250/221 |
| 5,499,016 A | * | 3/1996 | Pantus | 340/555 |
| 5,621,205 A | * | 4/1997 | Warner et al. | 250/205 |
| 5,684,294 A | * | 11/1997 | Kouhi | 250/214 AL |
| 6,157,024 A | * | 12/2000 | Chapdelaine et al. | 250/221 |
| 6,548,979 B2 | * | 4/2003 | Boisvert et al. | 318/469 |
| 2005/0169643 A1 | * | 8/2005 | Franklin | 398/187 |

FOREIGN PATENT DOCUMENTS

| | | |
|---|---|---|
| JP | 8-171679 | 7/1996 |
| JP | 2001-235367 | 8/2001 |

* cited by examiner

*Primary Examiner*—David P Porta
*Assistant Examiner*—Jessica L Eley
(74) *Attorney, Agent, or Firm*—Wenderoth, Lind & Ponack, L.L.P.

(57) ABSTRACT

According to an embodiment, a light-projecting apparatus including a light-projector emitting an infrared light beam, a light-projector drive portion pulse-driving the light-projector; and a receiver; and a light-receiving apparatus including a light-receiver receiving the infrared light beam emitted by the light-projector, a light interruption judgment portion judging that the infrared light beam is interrupted when at least a predetermined number of pulses are successively not output by the light-receiver, a light-receiving state detection portion detecting a light-receiving state of the infrared light beam, and a transmitter transmitting the light-receiving state information to the receiver are provided. The period of the pulse driving signal in the light-projector drive portion is changed based on the information received by the receiver.

6 Claims, 4 Drawing Sheets

OUTDOOR ACTIVE INFRARED DETECTION APPARATUS WITH ADJUSTABLE DRIVE FREQUENCY

CROSS-REFERENCE TO RELATED APPLICATION

This application claims priority under U.S.C. § 119(a) on Patent Application No. 2004-333226 filed in Japan on Nov. 17, 2004, the entire contents of which are hereby incorporated by reference.

BACKGROUND OF THE INVENTION

1. Field of the Invention

The present invention relates to an active infrared detection apparatus for use in security systems or the like, and more specifically to an active infrared detection apparatus that can maintain its reliability of operation when installed outdoors, even when the surrounding environment deteriorates.

2. Related Art

Conventionally, active infrared detection apparatuses for detecting the intrusion of an intruder into an alert territory, which are used in security systems, are known.

This type of active infrared detection apparatus generally includes a light-projecting apparatus including a light-projector, and a light-receiving apparatus including a light-receiver. The light-projecting apparatus and the light-receiving apparatus are installed at both ends of a straight-line alert territory, and an infrared light beam is emitted from the light-projector of the light-projecting apparatus toward the light-receiver of the light-receiving apparatus. Then, when the infrared light beam is interrupted by an intruder or the like and the amount of light received by the light-receiver changes, the apparatus activates for example a security camera or triggers an alarm call to a security company.

Incidentally, due to the influence of modulated light of fluorescent lamps or high frequency waves by AC radios or the like, it may happen that the active infrared detection apparatus does not operate properly. One example of this is the case that the light-receiving apparatus receives modulated light (noise signal) from a fluorescent lamp with about twice the frequency of the pulsed light of the infrared light beam from the light-projecting apparatus. In such an event, as long as the light of the fluorescent lamp is not blocked, the light-receiving apparatus continues to receive modulated light from the fluorescent lamp, even if someone intrudes into the alert territory and blocks the infrared light beam.

In this situation, it becomes impossible to distinguish between a state in which the pulsed light of the infrared light beam which is originally supposed to be detected is received and a state in which the noise signal is received. As a result, it becomes impossible for the active infrared detection apparatus to recognize that someone has intruded into the alert territory and it lapses into a state of "missed alarm". Such a state of "missed alarm" is not limited to the case that the noise signal has the double frequency of the pulsed light of the infrared light beam, but can occur when the frequency of the noise signal is about an integer multiple or when it is a frequency higher than the pulsed light of the infrared light beam.

In view of this, an active infrared sensor, that, when installed in an environment with a noise signal, is capable of recognizing a deterioration of the environment and the risk of an missed alarm, has been proposed (e.g., JP 2001-235367A).

Meanwhile, when such an active infrared detection apparatus is installed outdoors, it happens that due to the seasonal or climatic conditions, frost or fog adheres to the infrared light beam transmission window portion of the cover. When that happens, through the attenuation of the infrared light beam, the amount of light received by the light-receiving elements decreases notably and there is a risk of a "false alarm", in which it is determined that there is an intruder, even when no intruder is present.

In view of these problems, an infrared light beam sensor has been proposed that can prevent the adhering of frost or fog by providing a hood on top of the infrared light transmission window portion of the cover, and furthermore providing the infrared light window transmission portion with a planar heater (see, for example, JP H8-171679A).

However, the conventional art, such as the above-mentioned JP H8-171679A, is not effective when there are factors, such as fog or rain that attenuate the infrared light beam at a location away from the active infrared detection apparatus.

Furthermore, in view of such factors that attenuate the infrared light beam, in order to let an infrared light beam of sufficient intensity reach the light-sensitive elements even under such circumstances, it is conceivable to set the infrared light beam to strong intensity in advance. However, when no factor that attenuates the infrared light beam occurs, there is the possibility that due to the strong intensity of the infrared light beam a missed alarm occurs due to the reflection light from objects that are not to be detected in the vicinity of the active infrared sensor.

SUMMARY OF THE INVENTION

It is an object of the present invention to provide a highly reliable active infrared detection apparatus that, when installed outdoors, avoids false alarms as much as possible, regardless of whether or not factors such as fog or rain occur that attenuate the infrared light beam.

An active infrared detection apparatus according to the present invention includes a light-projecting apparatus and a light-receiving apparatus, wherein the light-projecting apparatus includes a light-projector emitting an infrared light beam; a light-projector drive portion pulse-driving the light-projector based on a pulse-driving signal with a predetermined period; and a receiver setting the period of the pulse-driving signal based on received information; and the light-receiving apparatus includes a light-receiver receiving the infrared light beam emitted by the light-projector and outputting a corresponding pulse signal; a light interruption judgment portion judging that the infrared light beam is interrupted when at least a predetermined number of pulses are successively not output by the light-receiver; a light-receiving state detection portion detecting a light-receiving state of the infrared light beam, based on the output of the light-receiver; and a transmitter transmitting the light-receiving state information detected by the light-receiving state detection portion to the receiver; and wherein the period of the pulse-driving signal in the light-projector drive portion is changed based on the light-receiving state information received by the receiver.

Herein, examples of the light-receiving state of the infrared light beam that is detected by the light-receiving state detection portion are the light-receiving level and the signal-to-noise-ratio of the infrared light beam. It is preferable to prolong the period of the pulse-driving signals in the light-projector drive portion if a decline of these is detected. Moreover, the judgment by the light interruption judgment portion may be performed based on pulse signals from the light-receiver that are higher than a predetermined level. In such a case, it is preferable that the predetermined level in the light interruption judgment portion is reduced when a decline of the light-receiving level or of the signal-to-noise-ratio of the infrared light beam is detected.

With an active infrared detection apparatus according to this aspect of the invention, when the light-receiving apparatus detects environmental deterioration, due to factors attenuating the infrared light beam, such as fog or rain, based on the light-receiving state of the infrared light beam, then this information is transmitted to the light-projecting apparatus and the period of the driving pulse of the light-projector is changed. In accordance with this change, also the period of the pulse signal that is output by the light-receiver varies and also the length of time corresponding to a predetermined number of pulses of this pulse signal changes. Thus it is possible to perform an appropriate detection of intruders in accordance with the environment, based on the length of the light interruption time when the infrared light beam is interrupted and it becomes possible to avoid false alarms or the like as much as possible, during environmental deterioration, such as due to fog or rain. If the period of the driving pulses of the light-projector are made longer, the pulse-driving time per unit time decreases, and thus also a reduction of electric power consumption becomes possible.

Alternatively, an active infrared detection apparatus according to the present invention includes a light-projecting apparatus and a light-receiving apparatus, wherein the light-projecting apparatus includes a light-projector emitting an infrared light beam; and a light-projector drive portion pulse-driving the light-projector based on a pulse-driving signal with a predetermined period; and the light-receiving apparatus includes a light-receiver receiving the infrared light beam emitted by the light-projector and outputting a corresponding pulse signal; a light interruption judgment portion judging that the infrared light beam is interrupted when at least a predetermined number of pulses are successively not output by the light-receiver; and a light-receiving state detection portion detecting the light-receiving state of the infrared light beam, based on the output of the light-receiver; and wherein the predetermined number for the judgment with the light interruption judgment portion is changed based on the detection result of the light-receiving state detection portion.

With an active infrared detection apparatus according to this aspect of the invention, when the light-receiving apparatus detects environmental deterioration, due to factors attenuating the infrared light beam, such as fog or rain, based on the light-receiving state of the infrared light beam, the predetermined number for the judgment with the light interruption judgment portion is changed and also the length of time corresponding to the predetermined number of pulses. Thus it becomes possible to perform an appropriate detection of intruders in accordance with the environment, based on the length of the light interruption time when the infrared light beam is interrupted, and it becomes possible to avoid false alarms as much as possible, during environmental deterioration, such as fog or rain. Moreover, no transmission of information concerning the environment from the light-receiving apparatus to the light-projecting apparatus is required, so that the configurations of the respective apparatuses become simple and thus a compact size and cost reduction can be achieved.

Alternatively, an active infrared detection apparatus according to the present invention includes a light-projecting apparatus and a light-receiving apparatus, wherein the light-projecting apparatus includes a light-projector emitting the infrared light beam; and the light-receiving apparatus includes a light-receiver receiving the infrared light beam emitted by the light-projector and outputting a corresponding signal; a light interruption judgment portion judging that the infrared light beam is interrupted when a reduction of the output level of the light-receiver continues for at least a predetermined time; and a light-receiving state detection portion detecting a light-receiving state of the infrared light beam, based on the output of the light-receiver; and wherein the predetermined time for the judgment with the light interruption judgment portion is changed based on the detection result of the light-receiving state detection portion.

With an active infrared detection apparatus according to this aspect of the invention, when the light-receiving apparatus detects an environmental deterioration, due to factors attenuating the infrared light beam, such as fog or rain, based on the light-receiving state of the infrared light beam, then the predetermined time for the judgment with the light interruption judgment portion is changed. Thus it becomes possible to perform an appropriate detection of intruders in accordance with the environment, based on the length of the light interruption time when the infrared light beam is interrupted and it becomes possible to avoid false alarms as much as possible, during environmental deterioration, such as due to fog or rain.

BRIEF DESCRIPTION OF THE DRAWINGS

FIG. 3(a) shows a case where no intruder is present. FIG. 3(b) shows a case where in fact no intruder is present, but the light-receiving apparatus is influenced by some accidental factors. FIG. 3(c) shows a case where an intruder is actually present.

FIG. 5(a) shows a case where no intruder is present. FIG. 5(b) shows a case where in fact no intruder is present, but the light-receiving apparatus is influenced by some accidental factors. FIG. 5(c) shows a case where an intruder is actually present.

FIG. 8(a) shows a case where no intruder is present. FIG. 8(b) shows a case where in fact no intruder is present, but the light-receiving apparatus is influenced by some accidental factors. FIG. 8(c) shows a case where an intruder is actually present.

DESCRIPTION OF THE PREFERRED EMBODIMENTS

Hereinafter, embodiments of the present invention will be described with reference to the accompanying drawings.

First Embodiment

Figure 1:
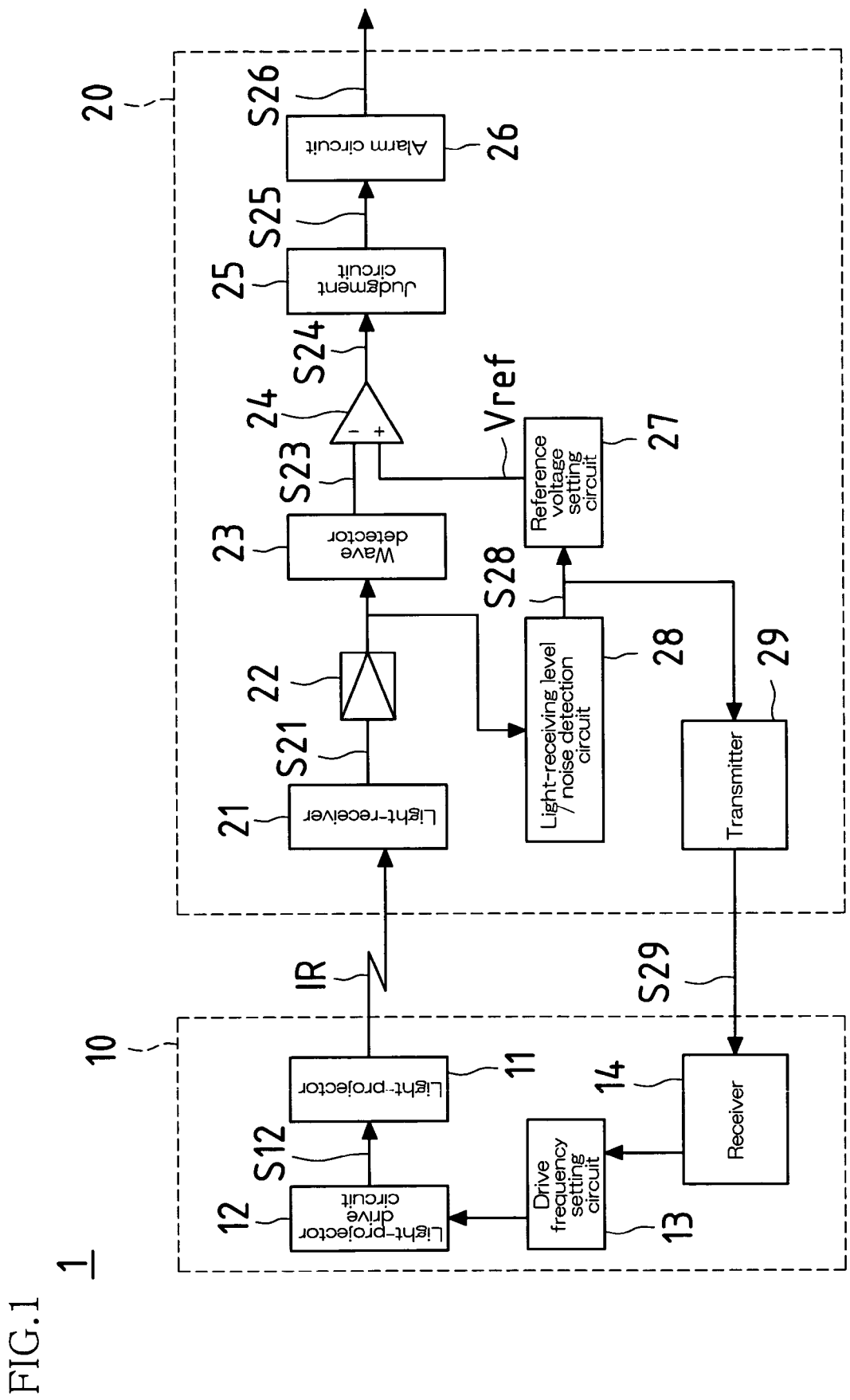
FIG. 1 is a block diagram illustrating the overall configuration of an active infrared detection apparatus according to a first embodiment of the present invention.

FIG. 1 is a block diagram illustrating the overall configuration of the active infrared detection apparatus according to a first embodiment of the present invention. This active infrared detection apparatus 1 includes a light-projecting apparatus 10 and a light-receiving apparatus 20, which are installed to walls or the like at both ends of a straight-line alert territory, so as to face each other with matching light axes. Each of the light-projecting apparatus 10 and the light-receiving apparatus 20 possesses a unitized structure. The following is an explanation of their respective structures and the overall operation.

(1) Light-Projecting Apparatus 10

The light-projecting apparatus 10 includes a light-projector 11, a light-projector drive circuit 12, a drive frequency setting circuit 13 and a receiver 14.

The light-projector 11 includes a light-emitting element, such as an infrared light emitting diode that emits infrared light, and a sending-side optical system, such as a light-projecting lens or a reflective mirror for forming an infrared light beam out of the infrared light emitted from the light-emitting element, and an infrared light beam IR is emitted with these components.

The light-projector drive circuit 12 pulse-drives the light-emitting element of the light-projector 11 with a pulse-driving signal S12 that corresponds to a predetermined frequency that is set by the drive frequency setting circuit 13, and modulates the infrared light beam IR at this predetermined frequency.

The receiver 14 receives environment information S29 transmitted from the light-receiving apparatus 20 and communicates the fact that the environmental conditions in which the active infrared detection apparatus 1 is installed have deteriorated to the drive frequency setting circuit 13.

The drive frequency setting circuit 13 sets up the frequency for the pulse-driving of the light-projector drive circuit 12. In a normal case, this drive frequency is set to, for example, 100 Hz (to a pulse period of 10 ms), but when the fact that the environmental circumstances have deteriorated is transmitted from the receiver 14, it lowers the drive frequency and changes it to, for example, 50 Hz (to a pulse period of 20 ms).

(2) Light-Receiving Apparatus 20

The light-receiving apparatus 20 is provided with a light-receiver 21, an amplifier 22, a wave detector 23, a comparator 24, a judgment circuit 25, an alarm circuit 26, a reference voltage setting circuit 27, a light-receiving level/noise detection circuit 28 and a transmitter 29.

The light-receiver 21 includes a receiving-side optical system, such as a light-receiving lens or a light-receiving mirror, and a light-receiving element, such as a phototransistor. It receives an infrared light beam IR emitted by the light-projecting apparatus 10 and outputs an electric signal S21 of a signal level corresponding to the amount of received infrared light. The electric signal S21 is amplified by the amplifier 22 and, after ambient light components and the like have been eliminated by the wave detector 23, converted into a pulse signal S23, corresponding to the level of the light reception signal of only the pulse-modulated waves. The comparator 24 compares the converted pulse signal S23 to the reference voltage Vref set by the reference voltage setting circuit 27 and only pulse signals S24 whose level is higher than the reference voltage Vref are output to the judgment circuit 25.

The judgment circuit 25 monitors the pulse signal S24 that is output by the comparator 24 and when the pulse output of the pulse signal S24, corresponding to the frequency of the pulse-driving signal S12 from the comparator 24 continues, it judges that no intruder is present. Even in the event that the pulses of the pulse signal S24 from the comparator 24 are interrupted, when the signal is output again within a predetermined time, it is judged that the interruption is not due to an intruder. However, when at least the predetermined time passes after the interruption of the pulse of the pulse signal S24, that is, when the light interruption time for which the infrared light beam is interrupted is at least the predetermined time, then it is judged that the infrared light beam was interrupted due to an intruder, and an intruder detection signal S25 is output to the alarm circuit 26. Thus, it is possible to avoid an erroneous output of the intruder detection signal S25, for example in the event that a temporary interruption of the pulse output of the pulse signal S24 is caused accidentally even though an intruder is not actually present.

The predetermined time in which the judgment circuit 25 judges the presence of an intruder is not treated as an absolute time but as a relative time with respect to the period of the pulse signal. When the pulse-drive frequency is 100 Hz, the pulse period is 10 ms, but when for example the pulse signal is not output for five times the time of the pulse period, that is, for at least 50 ms, it is judged that there is an intruder. Accordingly, the longer the pulse period is, the longer the predetermined time becomes.

When an intruder detection signal S25 is output from the judgment circuit 25, the alarm circuit 26 generates an alarm signal S26 to report the presence of an intruder. This alarm signal S26 may also be output to a security center (not shown in the figures).

Based on the output of the amplifier 22, the light-receiving level/noise detection circuit 28 detects the light-receiving level of the light-receiver 21, its degree of change, and the S/N ratio and the like. Then, when from these detection results it is judged that the environmental conditions in which the active infrared detection apparatus 1 is installed have deteriorated due to fog, rain or the like, an environment deterioration signal S28 is output to the reference voltage setting circuit 27 and to the transmitter 29.

The reference voltage setting circuit 27 outputs the reference voltage Vref of the comparator 24. If an environment deterioration signal S28 is output from the light-receiving level/noise detection circuit 28, the reference voltage setting circuit 27 reacts to the decline of the light-receiving level of the light-receiver 21 due to fog, rain or the like by reducing the reference voltage Vref to less than the normal voltage.

When the environment deterioration signal S28 is output from the light-receiving level/noise detection circuit 28, the transmitter 29 wirelessly transmits the fact that the environmental conditions have deteriorated to the light-projecting apparatus 10 in form of the environment information S29 via radio waves or the like.

(3) Operation of the Active Infrared Detection Apparatus 1

Figure 2:
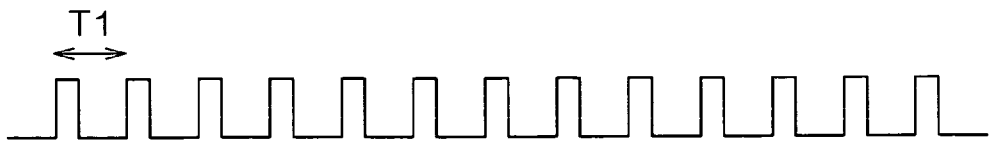
FIG. 2 is an example of a time chart showing the pulse-driving signal of the light-projector of the active infrared detection apparatus according to the first embodiment of the present invention during normal time.
Figure 3A:
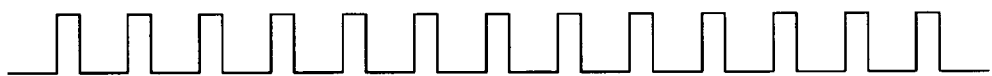
FIGS. 3(a) to 3(c) show examples of time charts of the pulse signal, that is input into a judgment circuit of the light-receiving apparatus at the time of FIG. 2.
Figure 3B:
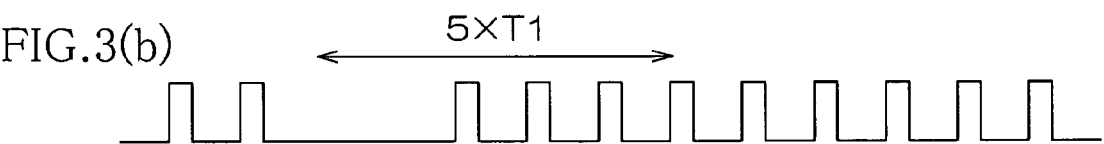
Figure 3C:
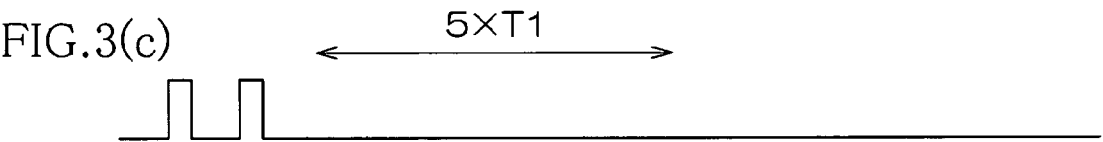

FIG. 2 is an example of a time chart showing the pulse-driving signal S12 of the light-projector 11 of the active infrared detection apparatus 1 according to the first embodiment of the present invention during normal time. FIGS. 3(a) to 3(c) show examples of time charts of the pulse signal S24 input into the judgment circuit 25 of the light-receiving apparatus 20 at this time. FIG. 3(a) shows a case where no intruder is present. FIG. 3(b) shows a case where in fact no intruder is present, but the light-receiving apparatus 20 is influenced by some accidental factors. FIG. 3(c) shows a case where an intruder is actually present.

When the environmental conditions in which the active infrared detection apparatus 1 is installed are normal, then the light-projector 11 is driven by a pulse-driving signal S12 of a first drive frequency (the pulse period is T1), as shown in FIG. 2.

When no intruder is present in the alert territory of the active infrared detection apparatus 1, the pulse signal S24 that is input into the judgment circuit 25 of the light-receiving apparatus 20 has a wave form that is similar to that of the pulse-driving signal S12, as shown in FIG. 3(a).

When the light-receiving apparatus 20 is influenced by some accidental factors even though there is actually no intruder in the alert territory, then some of the pulses that should appear in the pulse signal S24 of the light-receiving apparatus 20, disappears, as shown for example in FIG. 3(b). However, when the predetermined time for judging whether or not an intruder is present, is set to for example five times the pulse period T1 and the pulses appear again within this predetermined time, then it is possible to avoid an erroneous output of the intruder detection signal S25.

If an intruder is actually present in the alert territory, the pulse signal S24 of the light-receiving apparatus 20 becomes for example as shown in FIG. 3(c) and after the predetermined time has elapsed since the disappearance of the pulse, an intruder detection signal S25 is output by the judgment circuit 25.

Figure 4:
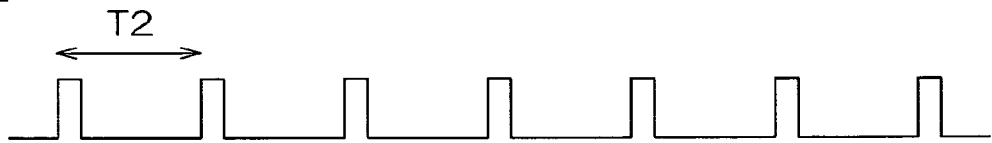
FIG. 4 is an example of a time chart showing the pulse-driving signal of the light-projector of the active infrared detection apparatus according to the first embodiment of the present invention during environmental deterioration.
Figure 5A:
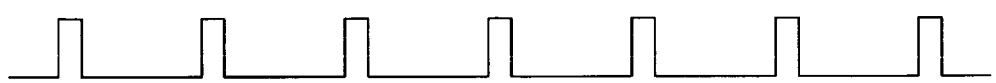
FIGS. 5(a) to 5(c) show examples of time charts of the pulse signal that is input into the judgment circuit of the light-receiving apparatus at the time of FIG. 4.
Figure 5B:
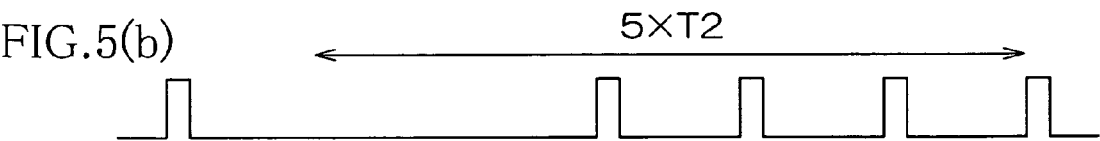
Figure 5C:
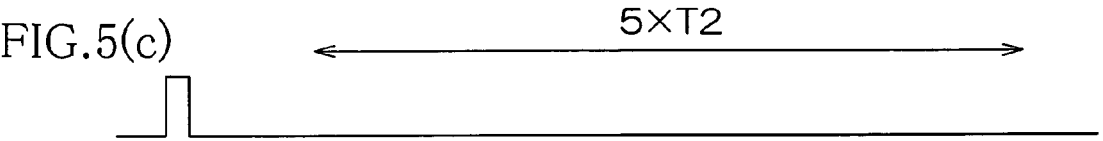

FIG. 4 is an example of a time chart showing the pulse-driving signal S12 of the light-projector 11 of the active infrared detection apparatus 1 according to the first embodiment of the present invention during environmental deterioration. FIGS. 5(a) to 5(c) show examples of time charts of the pulse signal S24 input into the judgment circuit 25 of the light-receiving apparatus 20 at this time. FIG. 5(a) shows a case where no intruder is present. FIG. 5(b) shows a case where in fact no intruder is present, but the light-receiving apparatus is influenced by some accidental factors. FIG. 5(c) shows a case where an intruder is actually present.

When the environmental conditions in which the active infrared detection apparatus is installed 1 have deteriorated, then the light-projector 11 is driven by a pulse-driving signal S12 of a second frequency (the pulse period is T2), that is lower than during normal time, as shown in FIG. 4.

When no intruder is present in the alert territory of the active infrared detection apparatus 1, the pulse signal S24 that is input into the judgment circuit 25 of the light-receiving apparatus 20 has a wave form that is similar to that of the pulse-driving signal S12, as shown in FIG. 5(a).

When no intruder is present in the alert territory but the light-receiving apparatus 20 is influenced by some accidental factors, then some of the pulses that should appear in the pulse signal S24 of the light-receiving apparatus 20 disappear, as shown for example in FIG. 5(b). However, when the predetermined time for judging whether or not an intruder is present is set to for example five times the pulse period T2 and the pulses appear again within this predetermined time, then it is possible to avoid an erroneous output of the intruder detection signal S25.

If an intruder is actually present in the alert territory, the pulse signal S24 of the light-receiving apparatus 20 becomes for example as shown in FIG. 5(c), and after the predetermined time has elapsed since the disappearance of the pulse, an intruder detection signal S25 is output by the judgment circuit 25.

When the environment of the active infrared detection apparatus 1 deteriorates, the infrared light beam attenuates and there is a risk that some of the pulses that should appear disappear, but by prolonging the predetermined time for judging whether or not an intruder is present, as described above, it is possible to reduce the number of false alarms.

Second Embodiment

Figure 6:
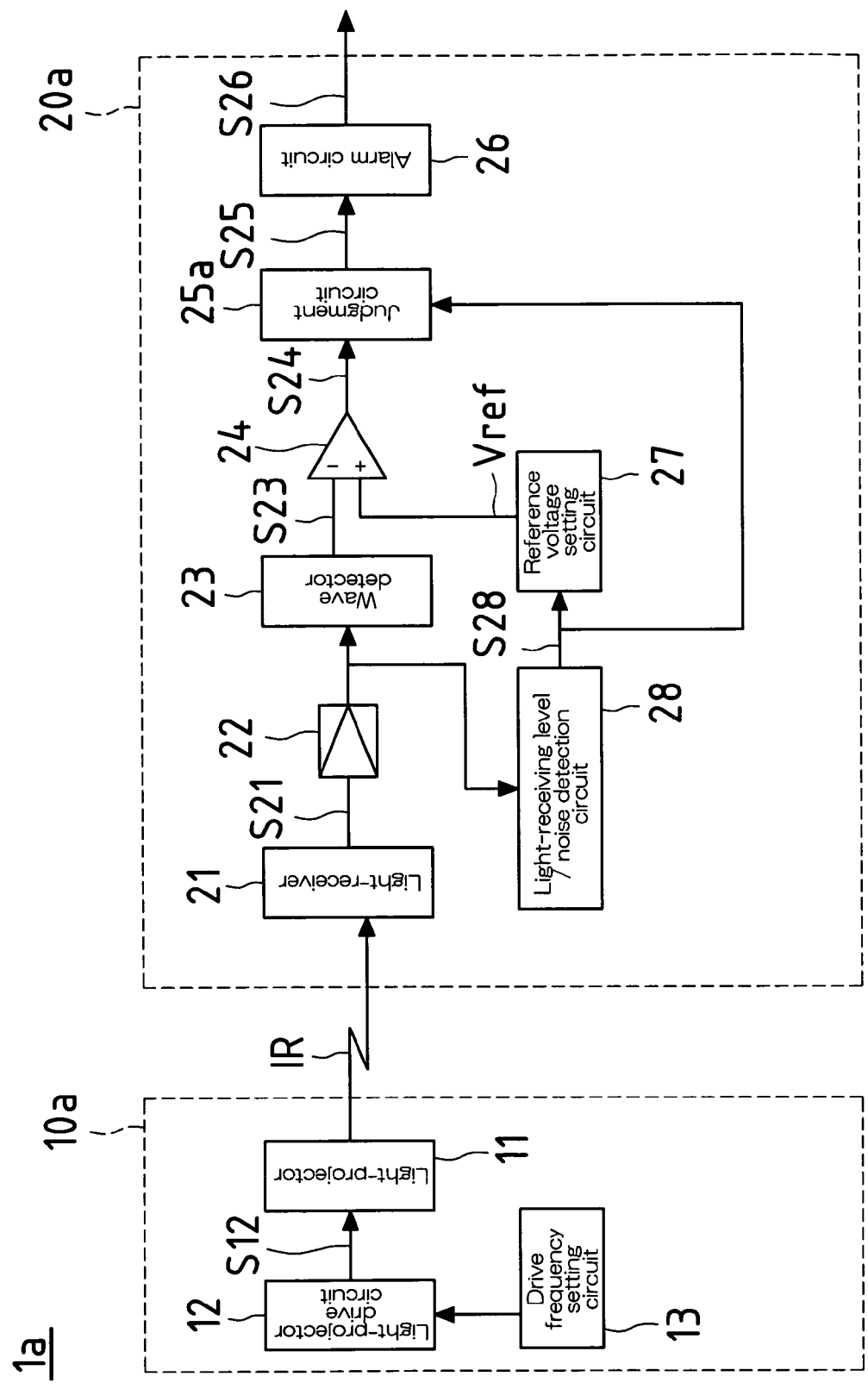
FIG. 6 is a block diagram illustrating the overall configuration of the active infrared detection apparatus according to a second embodiment of the present invention.

FIG. 6 is a block diagram illustrating the overall configuration of an active infrared detection apparatus 1a according to a second embodiment of the present invention. This active infrared detection apparatus 1a includes a light-projecting apparatus 10a and a light-receiving apparatus 20a. Except for the aspects mentioned below, the second embodiment is similar to the first embodiment, so that the same reference numerals are used for the same structural elements, and only the differences will be explained.

(1) Light-projecting Apparatus 10a

The light-projecting apparatus 10a includes a light-projector 11, a light-projector drive circuit 12 and a drive frequency setting circuit 13. Unlike the first embodiment, a receiver 14 is not provided and the pulse-drive frequency that is set by the drive frequency setting circuit 13 is fixed.

(2) Light-receiving Apparatus 20a

The light-receiving apparatus 20a includes a light-receiver 21, an amplifier 22, a wave detector 23, a comparator 24, a judgment circuit 25a, an alarm circuit 26, a reference voltage setting circuit 27 and a light-receiving level/noise detection circuit 28.

When the light-receiving level/noise detection circuit 28 judges that the environmental conditions in which the active infrared detection apparatus 1 is installed have deteriorated due to fog, rain or the like, the environment deterioration signal S28 is output to the reference voltage setting circuit 27 and to the judgment circuit 25a.

The judgment circuit 25a monitors the pulse signal S24 that is output by the comparator 24, just like the judgment circuit 25 of the first embodiment, but it is configured so as to change the predetermined time for judging whether or not an intruder is present, depending on the environment deterioration signal S28. That is to say, when the environment deterioration signal S28 is output from the light-receiving level/noise detection circuit 28, the predetermined time for judging whether or not an intruder is present is set to more than during normal time. For example, if the judgment is performed with 50 ms during normal time, then it is performed with 100 ms, which is twice that of normal time, during environmental deterioration.

In the judgment circuit 25a, the time that passes after the pulse signal is interrupted is treated as absolute time, but to simplify the circuit, a time that is an integer multiple of the period of the pulse signal is set. If the pulse-drive frequency is 100 Hz, then the pulse period is 10 ms, so that during normal time, it is set to five times the pulse period and during environmental deterioration, it is set to ten times the pulse period. However, there is no limitation to this, and a timer or the like can also be used for measuring the elapsed time.

(3) Operation of the Active Infrared Detection Apparatus 1a

Figure 7:
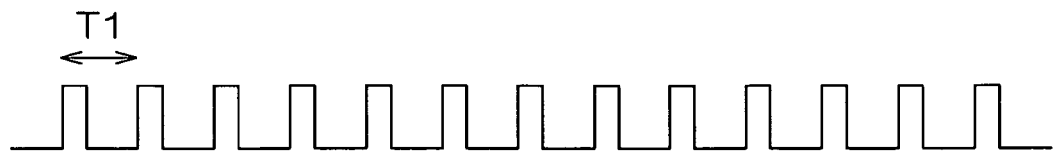
FIG. 7 is an example of a time chart showing the pulse-driving signal of the light-projector of the active infrared detection apparatus according to the second embodiment of the present invention.
Figure 8A:
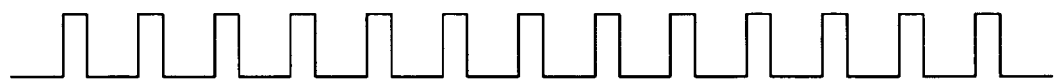
FIGS. 8(a) to 8(c) show examples of time charts of the pulse signal, that is input into the judgment circuit of the light-receiving apparatus at the time of FIG. 7.
Figure 8B:
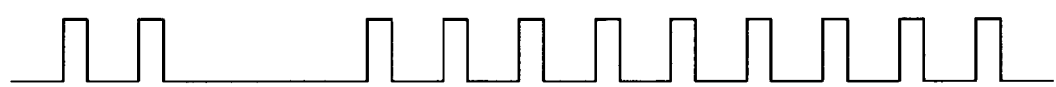
Figure 8C:

FIG. 7 is an example of a time chart showing the pulse-driving signal S12 of the light-projector 11 of the active infrared detection apparatus 1a according to the second embodiment of the present invention. FIGS. 8(a) to 8(c) show examples of time charts of the pulse signal S24 that is input into the judgment circuit 25 of the light-receiving apparatus 20a at this time. FIG. 8(a) shows a case where no intruder is present. FIG. 8(b) shows a case where in fact no intruder is present, but the light-receiving apparatus 20a is influenced by some accidental factors. FIG. 8(c) shows a case where an intruder is actually present.

Regardless of the environmental conditions in which the active infrared detection apparatus 1a is installed, as shown in FIG. 7, the light-projector 11 is driven by the pulse-driving signal S12 of a first drive frequency (the pulse period is T1).

When no intruder is present in the alert territory of the active infrared detection apparatus 1a, the pulse signal S24, which is input into the judgment circuit 25 of the light-receiving apparatus 20a, has a wave form that is similar to the pulse-driving signal S12 as shown in FIG. 8(a).

When the light-receiving apparatus 20a is influenced by some accidental factors even though there is actually no intruder in the alert territory, then some of the pulses that should appear in the pulse signal S24 of the light-receiving apparatus 20a disappear, as shown for example in FIG. 8(b). However, when the pulses appear again within the predetermined time for judging whether or not an intruder is present (for example five times the pulse period T1 during normal time and ten times the pulse period during environmental deterioration), then it is possible to avoid an erroneous output of the intruder detection signal S25.

If an intruder is actually present in the alert territory, the pulse signal S24 of the light-receiving apparatus 20 becomes for example as shown in FIG. 8(c) and after the predetermined time has elapsed since the disappearance of the pulse, an intruder detection signal S25 is output by the judgment circuit 25.

When the environment of the active infrared detection apparatus 1a deteriorates, the infrared light beam attenuates and there is a risk that some of the pulses that should appear disappear, but through extension of the predetermined time for judging whether or not an intruder is present, it is possible to reduce the number of false alarms.

The present invention can be embodied and practiced in other different forms without departing from the spirit, motive and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An active infrared detection apparatus comprising:
   a light-projecting unit comprising:
      a light-projector for emitting an infrared light beam;
      a light-projector drive portion for pulse-driving the light-projector based on a pulse-driving signal with a predetermined period; and
      a first receiver for dynamically setting the predetermined period of the pulse-driving signal; and
   a light-receiving unit comprising:
      a second receiver for receiving the infrared light beam emitted by the light-projector and outputting a corresponding pulse signal;
      a light interruption judgment portion for judging that the infrared light beam is interrupted when at least a predetermined number of pulses are successively not output by the second receiver;
      a light-receiving state detection portion for detecting a light-receiving state of the infrared light beam, based on the output of the second receiver; and
   a wireless transmitter for wirelessly transmitting the light-receiving state information detected by the light-receiving state detection portion to the first receiver;
   wherein the light-projecting unit is disposed at a first end of an alert territory and the light-receiving unit is disposed at a second end of the alert territory, such that the light-projecting unit and the light-receiving unit face each other, and
   wherein the first receiver dynamically sets the predetermined period of the pulse-driving signal based on the light-receiving state information from the wireless transmitter, and the predetermined period of the pulse-driving signal in the light-projector drive portion is changed based on the light-receiving state information.

2. The active infrared detection apparatus according to claim 1, wherein the predetermined period of the pulse-driving signal in the light-projector drive portion is prolonged when the light-receiving state detection portion detects a decline of the light-receiving level or a decline of the signal-to-noise-ratio of the infrared light beam.

3. The active infrared detection apparatus according to claim 2, wherein the light interruption judgment portion performs its judgment based on a pulse signal from the light-receiver that has at least a predetermined level.

4. The active infrared detection apparatus according to claim 3, wherein the predetermined level in the light interruption judgment portion is reduced when the light-receiving state detection portion detects a decline of the light-receiving level or a decline of the signal-to-noise-ration of the infrared light beam.

5. The active infrared detection apparatus according to claim 1, wherein the light interruption judgment portion performs its judgment based on a pulse signal from the second receiver that has at least a predetermined level.

6. The active infrared detection apparatus according to claim 5, wherein the predetermined level in the light interruption judgment portion is reduced when the light-receiving state detection portion detects a decline of the light-receiving level or a decline of the signal-to-noise-ratio of the infrared light beam.

* * * * *